(12) United States Patent
Huffer

(10) Patent No.: US 10,214,337 B2
(45) Date of Patent: Feb. 26, 2019

(54) PRECISION SCORED EXTERIOR POCKET FOR FLEXIBLE PACKAGE

(71) Applicant: Sonoco Development, Inc., Hartsville, SC (US)

(72) Inventor: Scott William Huffer, Hartsville, SC (US)

(73) Assignee: Sonoco Development, Inc., Hartsville, SC (US)

( * ) Notice: Subject to any disclaimer, the term of this patent is extended or adjusted under 35 U.S.C. 154(b) by 329 days.

(21) Appl. No.: 15/235,893

(22) Filed: Aug. 12, 2016

(65) Prior Publication Data
US 2018/0044091 A1    Feb. 15, 2018

(51) Int. Cl.
| | |
|---|---|
| *B32B 37/12* | (2006.01) |
| *B32B 37/14* | (2006.01) |
| *B65D 77/26* | (2006.01) |
| *B65D 33/00* | (2006.01) |
| *B65D 33/20* | (2006.01) |
| *B65D 33/22* | (2006.01) |
| *B65D 77/24* | (2006.01) |
| *B65D 25/20* | (2006.01) |

(52) U.S. Cl.
CPC .............. *B65D 77/26* (2013.01); *B32B 37/12* (2013.01); *B32B 37/14* (2013.01); *B65D 25/20* (2013.01); *B65D 33/007* (2013.01); *B65D 33/20* (2013.01); *B65D 33/22* (2013.01); *B65D 77/245* (2013.01); *B32B 2439/00* (2013.01)

(58) Field of Classification Search
CPC ...... B65D 77/26; B65D 77/24; B65D 77/245; B65D 33/007; B65D 33/20; B65D 33/22; B65B 37/12; B65B 37/14; B65B 2439/00; B65B 2439/06

USPC .......................................................... 206/223
See application file for complete search history.

(56) References Cited

U.S. PATENT DOCUMENTS

| | | | |
|---|---|---|---|
| 6,517,243 B2* | 2/2003 | Huffer .................... | B65D 33/20 383/116 |
| 7,717,620 B2* | 5/2010 | Hebert .................. | B29C 59/007 383/116 |
| 8,262,830 B2 | 9/2012 | Hebert et al. | |
| 8,262,832 B2 | 9/2012 | Hebert et al. | |

(Continued)

FOREIGN PATENT DOCUMENTS

| | | |
|---|---|---|
| CN | 200957909 Y | 10/2007 |
| EP | 3009016 A1 | 4/2016 |

OTHER PUBLICATIONS

Machine Translation of CN 200957909.*
International Search Report related to Application No. PCT/US2017/045830; dated Oct. 25, 2017.

*Primary Examiner* — Steven A. Reynolds
*Assistant Examiner* — Javier A Pagan
(74) *Attorney, Agent, or Firm* — Miller, Matthias & Hull LLP

(57) ABSTRACT

A flexible walled package formed from a multiple layer laminate and having an external recloseable pocket for holding a scoop or other item is provided. The pocket has a back panel formed from part of an inner layer and a front panel formed from part of a scored outer layer. Outside the perimeter of the pocket the inner layer and the outer layer are adhered together with permanent adhesive. Inside the pocket perimeter the inner layer and the outer layer may be adhered together with pressure sensitive adhesive to close the pocket.

19 Claims, 3 Drawing Sheets

(56) References Cited

U.S. PATENT DOCUMENTS 8,545,099 B2 * 10/2013 Davis .................... B29C 59/007
  383/5
2014/0177983 A1 * 6/2014 Trollen .................. B65D 33/16
  383/203

* cited by examiner

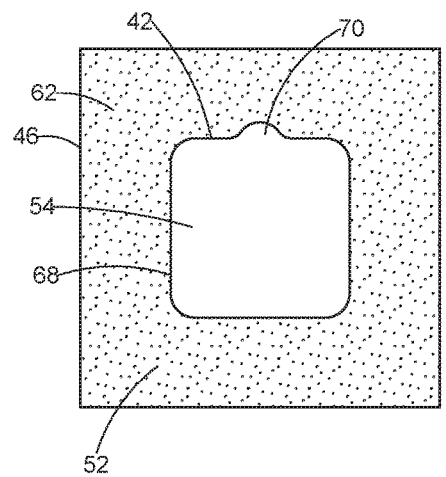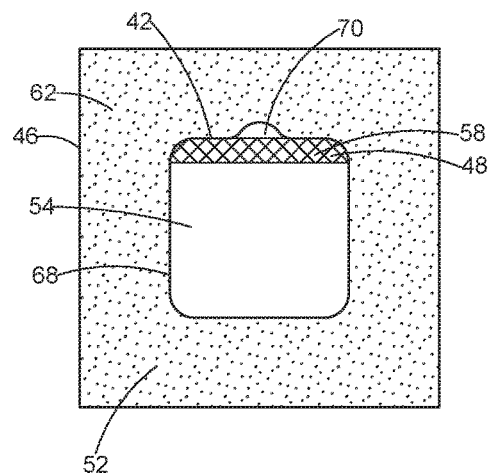
FIG. 4A　　　　　　　FIG. 4B
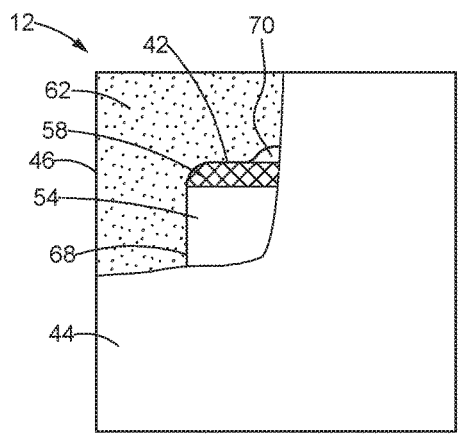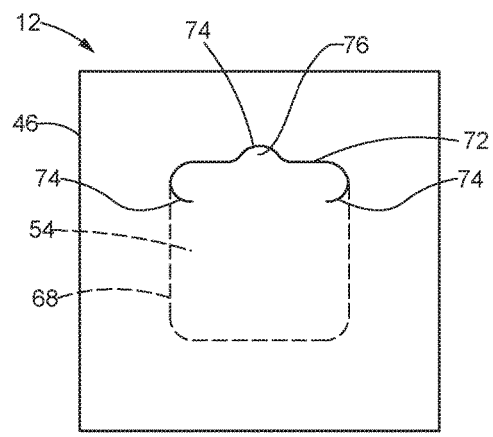
FIG. 4C　　　　　　　FIG. 4D

PRECISION SCORED EXTERIOR POCKET FOR FLEXIBLE PACKAGE

BACKGROUND OF THE INVENTION

Field of the Invention

This disclosure relates to flexible packaging. More particularly, this disclosure relates to a flexible package made from a laminate film in which an outer layer has precision scored to provide an exterior pocket.

Description of the Related Art

A scoop is often packaged together in a flexible package with powdered or granular products such as formula or drink mix. After using the scoop to remove a desired amount of product, the scoop is usually placed back inside the package along with the remaining product, where it must be retrieved during the next use. Sometimes the scoop becomes "buried" in the product. A need exists for storing the scoop outside the package after use. The present disclosure addresses this need.

BRIEF SUMMARY OF THE INVENTION

The present disclosure relates to a flexible package having an external pocket for holding a scoop or other item. The package is formed from a multiple layer laminate in which an outer layer has been scored to create the pocket. The pocket has a back panel formed from part of an inner layer and a front panel formed from part of the scored outer layer. Outside the perimeter of the pocket the inner layer and the outer layer are adhered together with permanent adhesive. Pressure sensitive adhesive may be pattern applied to a top marginal area on the inner or outer layer inside the pocket perimeter to allow the pocket to be recloseable.

BRIEF DESCRIPTION OF THE DRAWINGS

FIGS. 4A to 4D depict the pocket in various stages of manufacture.

FIG. 4A is a top plan view of an outer layer after a permanent adhesive has been pattern applied.

FIG. 4B is a top plan view of the outer layer of FIG. 4A after a pressure sensitive adhesive has been pattern applied.

FIG. 4C is partial cutaway top view of a laminate formed by laminating an inner layer to the outer layer of FIG. 4B.

FIG. 4D is a bottom view of the laminate of FIG. 4C after the outer layer—now shown on top—has been scored.

DETAILED DESCRIPTION OF THE INVENTION

Figure 1:
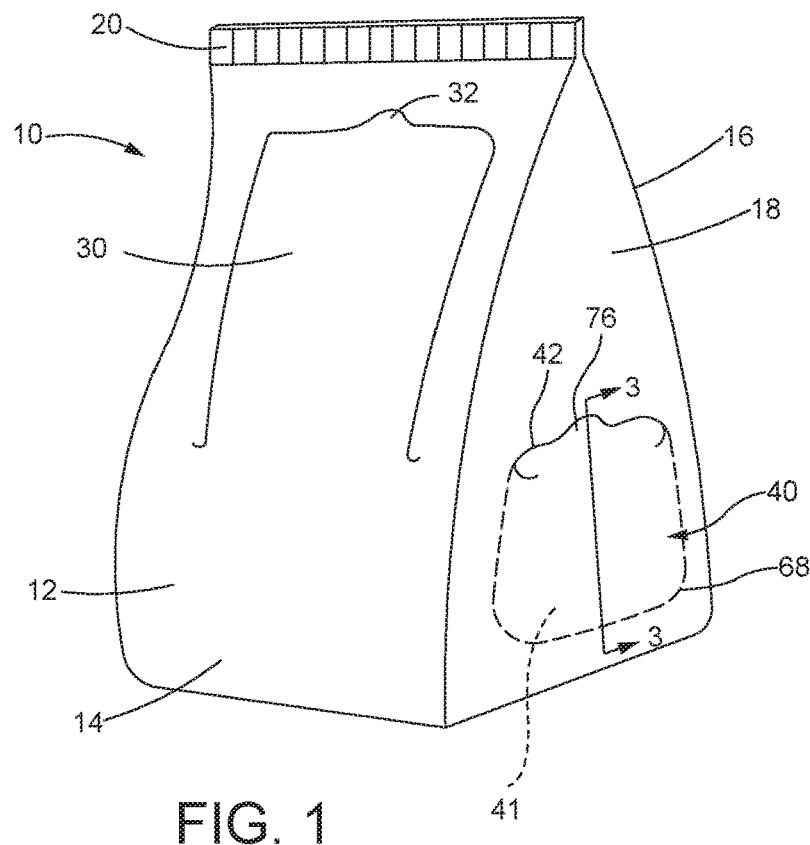
FIG. 1 is a perspective view of a flexible package according to the disclosure.

While the invention described herein is embodied in many forms, there is shown in the drawings and will herein be described in detail one or more embodiments with the understanding that this disclosure is to be considered an exemplification of the principles of the invention and is not intended to limit the invention to the illustrated embodiments. Aspects of the different embodiments can be combined with or substituted for one another.

Definitions

In the description that follows the following terms are used:

"ga" means gauge, a measure of thickness.

"Metallized" means the film surface has been coated with a metal such as aluminum.

"mOPP" means metallized oriented polypropylene.

"Oriented film" means that the film is stretched, either in the machine direction or cross machine direction or both, to increase tensile strength and clarity.

"PET" means polyethylene terephthalate.

"PSA" means pressure sensitive adhesive.

"Scoring" means producing a cut by laser cutting, machine (die) cutting or any suitable means of cutting a layer of material.

The Flexible Package

Referring to FIG. 1, an exemplary flexible package 10 made from a laminate film 12 is provided. The package 10 may comprise a front panel 14, a back panel 16 and two side or gusset panels 18. The package 10 may be filled with powder or granular content and closed at the top end 20 by, for example, heat sealing or cold sealing. The package includes an external pocket 40 for holding the scoop 50 or other item. Although the pocket 40 is shown located on a gusset panel 18, the pocket 40 may be located on any panel.

As explained in more detail below, the laminate 12 comprises an inner layer 44 of flexible material and an outer layer 46 of flexible material. A portion of the inner layer 44 functions as a back panel for the pocket 40 and a portion of the outer layer 46 functions as a font panel for the pocket 40.

Recloseable Flap

The package 10 may include a recloseable flap 30 having an adhesive-free pull tab 32 which allows the package 10 to be repeatedly opened and resealed. The recloseable flap 30 may be similar to those offered by Sonoco Products Company under the SMARTSEAL® brand and described in Sonoco U.S. Pat. Nos. 7,717,620; 8,262,830 and 8,262,832, among others.

The External Pocket

The package 10 includes a recloseable pocket 40 for holding a scoop 50 or other item. The pocket 40 can be located almost anywhere on the package 10, including on a gusset panel 18 as shown in FIGS. 1 and 2.

Figure 3:
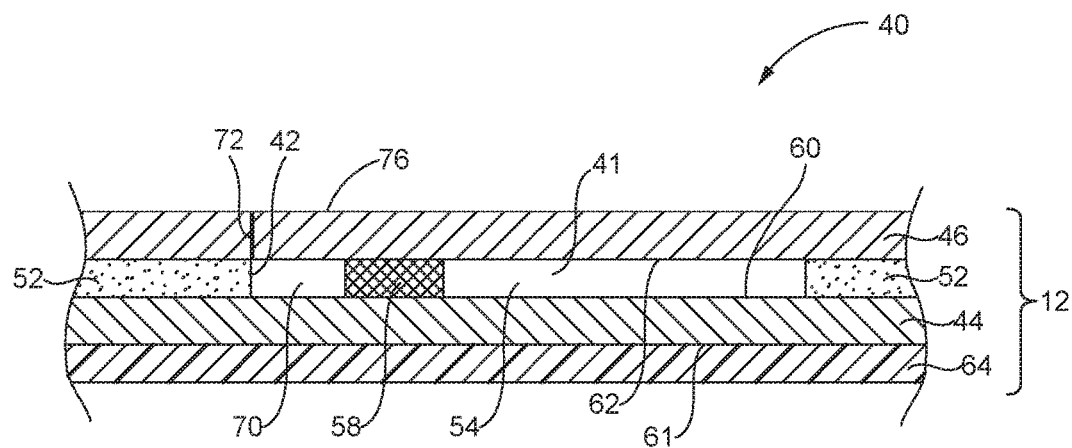
FIG. 3 is a cross-sectional view of the package of FIG. 1 taken along line 3-3.

FIGS. 1 and 3 show the pocket 40 in the closed position. In the closed position the outer layer 46 is adhered to the inner layer 44 by a pressure sensitive adhesive 58 that is pattern applied between the outer and inner layers 46, 44 along a top marginal region 48 (FIG. 4B) near the top of the pocket 40.

Figure 2:
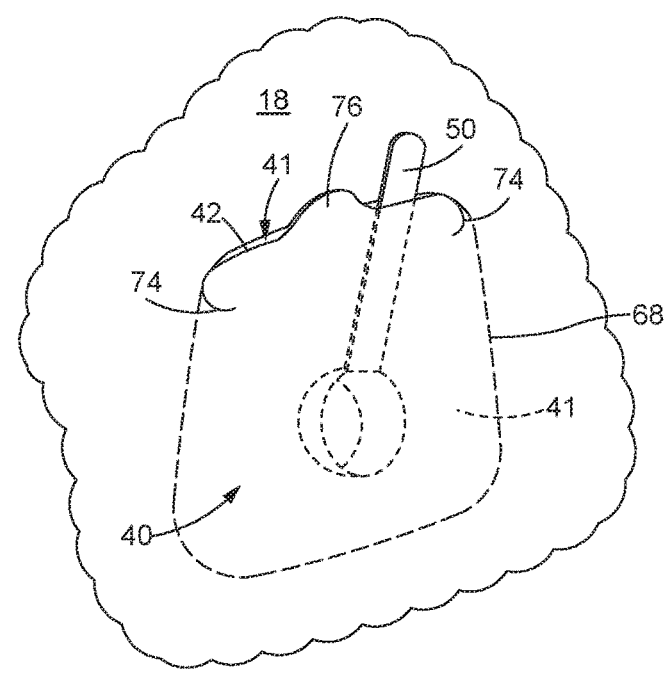
FIG. 2 is a close up perspective view of portion of the package of FIG. 1 showing a scoop stored inside a precision scored exterior pocket.
Figure 5:
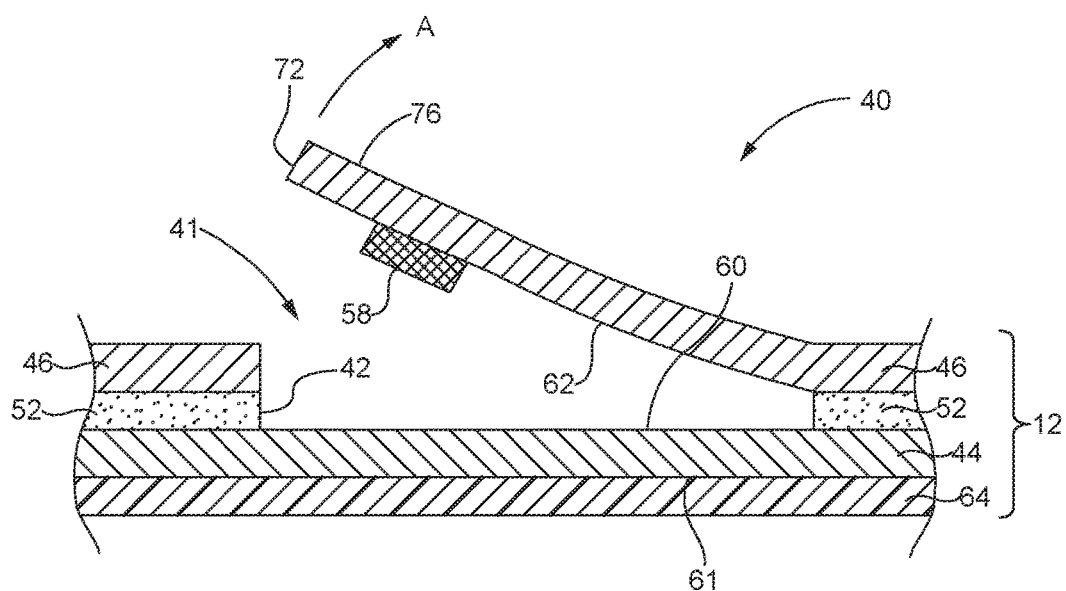
FIG. 5 is the same cross-sectional view as FIG. 3 but after the pocket has been opened.

When the pocket 40 is opened as shown in FIGS. 2 and 5, the pocket 40 defines an interior 41 for holding a scoop 50 or other item. The pocket 40 may be created at the same time as the recloseable flap 30.

FIG. 2 shows the pocket 40 with a scoop 50 stored inside the pocket 40. If the handle of the scoop 50 extends outside the pocket 40 as shown in FIG. 2, the pocket 40 remains at least partially opened. However, the pocket 40 may be sized to accommodate the entire scoop 50 or other item, and so may be completely closed when the item is stored inside the pocket 40.

To open the pocket 40 the user simply pulls on the top edge 42 of the pocket 40 (or on an integrally formed pull tab 76) in the direction shown by arrow A in FIG. 5, releasing the outer layer 46 of laminate 12 from the inner layer 44 along the top marginal region 48 located just below and substantially co-extensive with the top edge 42 of the pocket 40. The user can then place the scoop 50 or other item inside the pocket 40 and then partially or completely close the pocket 40 by pressing the outer layer 46 against the inner layer 44 along the top marginal region 48.

FIG. 3 is a cross-sectional view of the package 10 of FIG. 1 taken along line 3-3. Beyond the perimeter 68 of the pocket 40 the inner layer 44 of film is laminated to the outer layer 46 of film with a permanent adhesive 52. Within the perimeter 68 of the pocket 40, that is, within a pocket-shaped area 54, there is no permanent adhesive 52 between the inner layer 44 and the outer layer 46. However, a pressure sensitive adhesive 58 may be pattern applied to a preferably rectangular top marginal region 48 located within the pocket shaped area 54 just below and substantially co-extensive with the top edge 42 of the pocket 40.

In FIG. 3 the PSA 58 appears separated from the top edge 42 by an optional adhesive-free pull tab shaped area 70. Elsewhere along the top edge 42 the PSA 58 is adjacent to the top edge 42 as best shown in FIG. 4B.

The laminate 12 may be any suitable laminate, including one usable with food products. For example, for food packaging applications, the inner layer 44 may be metallized oriented polypropylene (mOPP) or any suitable material and has an outer facing surface 60 and an inner facing surface 61. The outer layer 46 may be made of polyethylene terephthalate (PET) film or any suitable material. The outer layer 46 has an inner facing surface 62. The outer layer 46 may be transparent and may bear reverse printing (ink) on its inner facing surface 62. Prior to being joined to the inner layer 44, the inner facing surface 62 of the outer layer 46 can be treated by a corona discharge or similar apparatus to render the inner facing surface 62 more receptive to ink and/or more readily bondable to adhesives. An optional sealant layer 64 may be adhered to the inner facing surface 61 of the inner layer 44.

Thus, from "outside in", an exemplary laminate 12 structure would be:

(i) an outer layer 46 of 92 ga PET;
  (ii) ink (not shown in the figures);
  (iii) pattern applied permanent adhesive 52 and pattern applied pressure sensitive 58;
  (iv) an inner layer 44 of 60 ga mOPP;
  (v) adhesive (not shown in the figures); and
  (vi) a sealant layer 64.

Thus a pocket 40 is provided that comprises a back panel formed from part of the inner layer 44 and a front panel formed from part of the scored outer layer 46. Outside the perimeter 68 of the pocket 40 the inner layer 44 and the outer layer 46 are adhered together with permanent adhesive 52. Inside the pocket perimeter 68, in a top marginal region 48, the inner layer 44 and the outer layer 46 are adhered together with pressure sensitive adhesive 58.

Method of Manufacture

The pocket 40 may be made in the following manner:

(1) Pattern apply a permanent adhesive 52 onto all or substantially all of one side of a first sheet of material except for a pre-determined pocket shaped area 54. As the name implies, the adhesive-free pocket shaped area 54 preferably is pocket shaped and has a perimeter 68. In addition, the adhesive-free area may include a pull tab shaped area 70 located at the top of the non-adhesive area 54.

The first sheet of material may be the inner layer 44 or, as shown in FIG. 4A, the outer layer 46. In this example the permanent adhesive 52 is pattern applied to the inner facing surface 62 of the outer layer 46. If applied to the inner layer 44, the permanent adhesive 52 would be pattern applied to its outer facing surface 60, that is, the side that faces the outer layer 46.

(2) Pattern apply a pressure sensitive adhesive 58 onto either the first sheet of material or a second sheet of material. In this example, as shown in FIG. 4B, the PSA 58 is pattern applied to the inner facing surface 62 of the outer layer 46 in the top marginal region 48 substantially adjacent to and just below the top edge 42 of the pocket shaped area 54. The top marginal region 48 may be substantially rectangular or any suitable shape. After this step the outer layer 46 bears both permanent adhesive 52 and pressure sensitive adhesive 58.

(3) As shown in FIG. 4C, a laminate film 12 is then created by adhesively joining the inner layer 44 to the outer layer 46 via the adhesives.

The laminate 12 of FIG. 4C is shown flipped over in FIG. 4D. In other words, in FIG. 4C the inner layer 44 is shown closest to the viewer, whereas in FIG. 4D the outer layer 46 is shown closest to the viewer.

(4) As shown in FIG. 4D, the outer layer 46 is scored along a score line 72 substantially in registration with the top edge 42 of the pocket shaped area 54, thus creating a slit for allowing access to the pocket 40. The score line 72 may include curved (e.g., U- or J-shaped) end portions 74 to prevent propagation of the score line 72 beyond the top edge 42 of the pocket 40.

Preferably the score line 72 extends only through the thickness of the outer layer 46 which forms the front panel of the pocket 40. The inner layer 44 is not scored, and forms the back panel of the pocket 40.

The score line 72 may be formed with a laser, by mechanical means or by any suitable means.

The score line 72 may be linear, curved or any suitable shape. In the illustrated embodiment, the score line 72 is substantially linear (like the top edge 42 of the pocket 40) except for an upwardly curved portion 74 and end portions 78. The end portions 78 curve (preferably inwardly toward each other) to prevent tearing of the outer layer 46 of laminate 12 beyond the score line 72. The upwardly curved portion 74 is located between the curved end portions 74 and forms a pull tab 76. The pull tab 76 overlies the adhesive-free area 70 located at the top of the adhesive-free pocket shaped area 54 and thus the pull tab 76 does not adhere to the opposing sheet, which in this example is inner layer 44.

Method of Use

A scoop 50 or other item may be placed initially inside the package 10. After the package 10 has been opened and the scoop 50 used to measure product taken from the package 10, the scoop 50 may be placed in the pocket 40 for easier access during future uses.

Before placing the scoop 50 in the pocket, the pocket may be opened by pulling on the pull tab 76 as indicated by arrow A in FIG. 5, thereby releasing the outer layer 46 from the inner layer 44 where the two layers are adhered together by the PSA 58 and exposing the pocket interior 41.

The outer layer 46 may be made of a material that has a greater bonding affinity to the PSA 58 than the inner layer 44 so that, upon opening the pocket 40, the PSA remains attached to the outer layer 46. Upon closing the pocket 40, the PSA 58 reattaches to the outer facing surface 60 of the inner layer 44.

It is understood that the embodiments of the invention described above are only particular examples which serve to illustrate the principles of the invention. Modifications and alternative embodiments of the invention are contemplated which do not depart from the scope of the invention as defined by the foregoing teachings and appended claims. It is intended that the claims cover all such modifications and alternative embodiments that fall within their scope.

The invention claimed is:

1. A package comprising a flexible wall formed from a laminate, the laminate comprising:
   an inner layer; and
   an outer layer, the outer layer comprising a fixed portion permanently attached to the inner layer by permanent adhesive and an adhesive-free pocket-shaped area tangentially attached to the fixed portion along a perimeter, the adhesive-free pocket-shaped area having a top edge, the outer layer further comprising a score line substantially in registration with the top edge;
   a portion of the inner layer and the pocket-shaped area of the outer layer forming an external pocket; the package further comprising
   a pressure sensitive adhesive pattern applied only to a top marginal region located entirely within the adhesive free pocket shaped area just below and co-extensive with the top edge, a remaining area of the adhesive free pocket shaped area being free from adhesive; wherein
   the external pocket has a closed position in which the inner layer and the outer layer are adhered together along the top marginal region and an open position in which the outer layer is at least partially disengaged from the inner layer along the top marginal region.

2. The package of claim 1 further comprising an article disposed inside the package and configured to fit at least partially within an interior defined by the external pocket.

3. The package of claim 2 wherein the package is configured to hold powder and granular product and the article is a scoop.

4. The package of claim 1 wherein the flexible wall is a gusset panel.

5. The package of claim 1 wherein:
   the adhesive-free area includes a pull tab shaped area located at the top edge; and
   the score line forms a pull tab that overlies the pull tab shaped area.

6. The package of claim 1 wherein:
   the score line includes curved end portions.

7. A package comprising:
   an inner layer;
   an outer layer coextensive with the inner layer, the outer layer comprising an adhesive area, a pocket shaped area and a top marginal region located within the pocket shaped area, the pocket shaped area having a perimeter, the perimeter having a top edge;
   a permanent adhesive layer disposed between the inner layer and the outer layer in an area that is coextensive with the adhesive area but not the pocket shaped area;
   a pressure sensitive adhesive disposed between outer layer and the inner layer only in a top marginal region located entirely within the pocket shaped area just below and co-extensive with the top edge, a remaining area of the adhesive free pocket shaped area being free from adhesive; and
   a score line extending through the outer layer substantially in registration with the top edge; wherein
   the inner layer and the pocket shaped area of the outer layer form a recloseable pocket.

8. The package of claim 7 wherein the outer layer and the inner layer are adhered to each other by the permanent adhesive along the entire perimeter except for the top edge.

9. The package of claim 8 wherein the top edge is substantially linear.

10. The package of claim 7 wherein the top marginal region is adjacent the top edge.

11. The package of claim 7 further comprising an article disposed inside the package and configured to fit at least partially within an interior defined by the pocket.

12. The package of claim 11 wherein the package is configured to hold powder and granular product and the article is a scoop.

13. The package of claim 7 wherein:
    the pocket shaped area includes a pull tab shaped area located at the top edge; and
    the score line forms a pull tab that overlies the pull tab shaped area.

14. The package of claim 13 wherein:
    the score line includes curved end portions.

15. A method of making a laminate having an external pocket, the method comprising the steps of:
    pattern applying a permanent adhesive onto a first sheet of material but excluding the permanent adhesive from a pre-determined pocket shaped area, the pocket shaped area having a perimeter, the perimeter having a top edge;
    pattern applying a pressure sensitive adhesive onto the first sheet of material in a predetermined pattern coinciding only with a top marginal region located entirely within the pocket shaped area and adjacent the top edge such that a remaining area of the adhesive free pocket shaped area is free from adhesive;
    adhesively joining the first sheet of material to a second sheet of material via the adhesives; and
    scoring one of the sheets of material along a score line substantially in registration with the top edge of the pocket shaped area.

16. The method of claim 15 wherein the first sheet of material is an outer layer of flexible material and the second sheet is an inner layer of flexible material.

17. The method of claim 16 wherein during the scoring step the outer layer is scored and the score line extends only through the thickness of the outer layer.

18. The method of claim 17 wherein the score line is formed with a laser.

19. The method of claim 17 wherein the score line is formed by die cutting.

* * * * *